US012324774B2

(12) United States Patent
An et al.

(10) Patent No.: US 12,324,774 B2
(45) Date of Patent: Jun. 10, 2025

(54) WHEELCHAIR

(71) Applicants: Hyundai Motor Company, Seoul (KR); Kia Corporation, Seoul (KR)

(72) Inventors: Jea Kyoo An, Seoul (KR); Hun Keon Ko, Anyang-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 668 days.

(21) Appl. No.: 17/696,017

(22) Filed: Mar. 16, 2022

(65) Prior Publication Data

US 2023/0000698 A1 Jan. 5, 2023

(30) Foreign Application Priority Data

Jun. 30, 2021 (KR) ........................ 10-2021-0086049

(51) Int. Cl.

*A61G 5/08* (2006.01)
*A61H 3/04* (2006.01)

(52) U.S. Cl.

CPC ............ *A61G 5/0866* (2016.11); *A61H 3/04* (2013.01)

(58) Field of Classification Search

CPC . A61G 5/10; A61G 5/14; A61G 5/107; A61G 5/122; A61G 5/124; A61G 5/128; A61G 5/0816; A61G 5/0866; A61G 5/1094; A61G 5/1059; A61G 5/1091; A61G 7/1017; A61H 3/04; A61H 2201/0149

USPC ...................................................... 280/250.1

See application file for complete search history.

(56) References Cited

U.S. PATENT DOCUMENTS

| | | | | |
|---|---|---|---|---|
| 5,240,277 | A * | 8/1993 | Scheulderman | A61G 5/1059 297/325 |
| 9,855,175 | B2 | 1/2018 | Wike, Jr. et al. | |
| 2020/0237602 | A1 | 7/2020 | Bardgett et al. | |

FOREIGN PATENT DOCUMENTS

| | | | |
|---|---|---|---|
| JP | 6600038 | B2 | 10/2019 |
| JP | 2020508826 | A | 3/2020 |
| KR | 101124072 | B1 | 3/2012 |
| KR | 102214760 | B1 | 2/2021 |
| KR | 102269093 | B1 * | 6/2021 |

* cited by examiner

*Primary Examiner* — Valentin Neacsu
*Assistant Examiner* — Felicia L. Brittman-Alabi
(74) *Attorney, Agent, or Firm* — SLATER MATSIL, LLP

(57) ABSTRACT

A rear side entry type wheelchair includes a driving device comprising a pair of driving frames provided on left and right sides thereof and driving wheels provided in the driving frames, respectively, a seat device including a pair of horizontal frames coupled to the driving device and saddles configured to be rotated about a vertical shaft on surfaces of the horizontal frames, a back support device including a back support opening/closing interworker provided on a rear side of the seat device and a back support provided in the back support opening/closing interworker configured to be foldable so as to be opened and closed, and a handle device provided on a front side of the seat device.

14 Claims, 12 Drawing Sheets

WHEELCHAIR

CROSS-REFERENCE TO RELATED APPLICATIONS

This application claims the benefit of Korean Patent Application No. 10-2021-0086049, filed on Jun. 30, 2021, which application is hereby incorporated herein by reference.

TECHNICAL FIELD

The present disclosure relates to a rear side entry type wheelchair.

BACKGROUND

A wheelchair is a device for assisting movement of a user, and refers to a chair with wheels that allows a patient or a person having a difficulty in walking to move while being seated thereon. In a description of a boarding scheme of the wheelchair, generally, first, after a user is located on a front side of the wheelchair while standing, the user grips the wheelchair located on the rear side by stretching out the hand while moving rearwards by one or two steps, and is seated on a saddle provided in the wheelchair while the body of the user is supported by the arms.

However, the method in which, after people having a difficulty in walking move backwards and enter a front side of the wheelchair, they board the wheelchair, significantly increases inconvenience of the user, and the boarding process of arranging a seating location while the wheelchair is located on the backside is also unstable so that another accident may be caused. Furthermore, the wheelchair generally has a form of a chair provided with the saddle at a height of a knee joint of the user who stands upright so that the joints of the upper and lower bodies may be burdened when the user who has a difficulty in behavior is seated. Accordingly, help of an assistant is necessary for stable seating in the conventional wheelchair.

In addition, because the wheelchair basically is a means for allowing a user to move while being seated, it may assist movement of the user, but it cannot be a treatment equipment for rehabilitation of the patient.

Meanwhile, a treatment device for rehabilitation of walking of the patient is a walker. The walker is a device equipped with wheels that may assist movements of patients or people who have a difficulty in walking, and has a similar aspect to the wheelchair, but unlike the wheelchair, is used while a user stands upright and the user directly walks by using the lower body. The walker helps rehabilitation through kinetic stimulation by assisting the standing posture of the user.

For example, Japanese Patent Application Publication No. 2020-508826 discloses an invention related to 'a wheelchair for assisting walking' in which functions of a wheelchair and a walker are combined. However, according to Japanese Patent Application Publication No. 2020-508826, because a user has to enter the wheelchair located on the rear side and be seated on a saddle located at a low height to board the wheelchair, there is still an aspect of the safety of the user, and in order for the user to be seated on the wheelchair after using the device for the purpose of a walker in a standing state and converting the function of the device to the wheelchair, the proceeding direction of the user may be changed for a stop, a rotation, or a rearward movement, which causes a problem in an aspect of convenience.

Accordingly, a device that allows a rehabilitation treatment of a user who uses a wheelchair and also provides further improved safety and convenience is necessary.

SUMMARY

Embodiments of the present disclosure can solve the above-mentioned problems occurring in the prior art while advantages achieved by the prior art are maintained intact.

An embodiment of the present disclosure provides a rear side entry type wheelchair that functions as a walker that helps rehabilitation while a user is standing and functions as a movement means while the user is seated, and, in particular, allows the user to be seated after adjusting a location and a height of a saddle after entering a rear side of the wheelchair to improve convenience and secure safety.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a rear side entry type wheelchair includes a driving device including a pair of driving frames provided on left and right sides thereof, and driving wheels provided in the driving frames, respectively, a seat device including a pair of horizontal frames coupled to the driving device, and saddles that are rotated about a vertical shaft on surfaces of the horizontal frames, a back support device including a back support opening/closing interworker provided on a rear side of the seat device, and a back support provided in the back support opening/closing interworker to be foldable so as to be opened and closed, and a handle device provided on a front side of the seat device.

Each of the driving frames may include a front frame and a rear frame coupled to the front frame with at least one joint while forming a specific angle with the front frame.

Each of the driving frames may further include a height adjusting driver that adjusts a height of the seat device by adjusting the angle between the front frame and the rear frame.

The height adjusting driver may be a linear driver connected to the front frame and the rear frame, and that adjusts the angle between the front frame and the rear frame according to a change in a length thereof.

The height adjusting driver may be a rotary driver provided in the joint, and that adjusts the angle between the front frame and the rear frame through rotation of a motor included in an interior thereof.

The back support opening/closing interworker may unfold the back support when the angle between the front frame and the rear frame is increased by the height adjusting driver, and may cause the driving frame and the back support to interwork with each other such that the back support is folded when the angle between the front frame and the rear frame is decreased.

The back support opening/closing interworker may include a link connected to the rear frame, and that is rotated within a specific range according to a change in the angle between the front frame and the rear frame, an inner rack, one side of which is coupled to the horizontal frame and an opposite side of which is coupled to the link to be slid, an outer rack located on an opposite side of the inner rack with the link being interposed therebetween, coupled to the link to be slid, and coupled to be moved in an opposite direction to the inner rack, and a pinion protruding from the link to be provided between the inner rack and the outer rack, and that causes movements of the inner rack and the outer rack to interwork with each other in opposite directions.

The back support may include at least one folding unit body, and the folding unit body may include a bar-shaped first folding member, a bar-shaped second folding member coupled to the first folding member to cross the first folding member in an X form so as to be rotatable, and a support member coupled to one end of the first folding member and one end of the second folding member at the same time.

The folding unit body directly coupled to the back support opening/closing interworker may be configured such that an opposite end of the first folding member is coupled to the link and an opposite end of the second folding member is coupled to the outer rack so that the back support is unfolded when the link is lowered and the outer rack is raised and the back support is folded when the link is raised and the outer rack is lowered.

The horizontal frame may have a through-hole on one side thereof.

The saddle may include a plate, and an insertion/coupling member provided at an edge of the plate and having a hollow portion in an interior thereof.

The insertion/coupling member may be inserted into and coupled to the through-hole such that the saddle is axis-rotated on one surface of the horizontal frame.

The driving device and the seat device may be coupled to each other by a vertical coupling member, and one side of the vertical coupling member may be coupled to the driving frame and an opposite side of the vertical coupling member may be inserted into the hollow portion of the interior of the insertion/coupling member inserted into and coupled to the through-hole.

The driving device may further include a foot support provided in the front frame.

The handle device may include a handle, and a saddle adjusting device connecting the handle and the saddle and that adjusts a location of the saddle by rotating the saddle.

The saddle adjusting device may include a saddle adjusting member coupled to an outer peripheral surface of the handle to be rotatable, a miter gear that transmits rotational power applied to the saddle adjusting member to the saddle, and a gear frame surrounding the saddle adjusting member and the miter gear.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
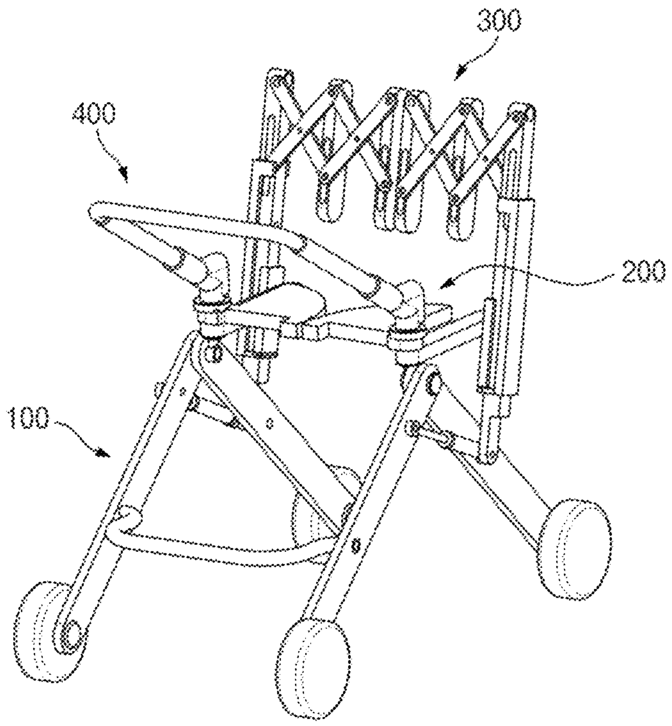
FIG. 1 is a front perspective view illustrating a state in which a back support is closed in a rear side entry type wheelchair according to a first embodiment of the present disclosure.

Hereinafter, preferred embodiments of the present disclosure will be described in detail with reference to the accompanying drawings so that an ordinary person in the art to which the present disclosure pertains may easily carry out the present disclosure. However, the present disclosure may be implemented in various different forms, and is neither restricted nor limited by the following embodiments.

In order to clearly describe embodiments of the present disclosure, a detailed description of a part that is not related to the description or related known technologies that may make the essence of the present disclosure unclear will be omitted, and in adding reference numerals to elements of the drawings in the specification, the same or similar reference numerals will be given to the same or similar elements throughout the specification.

It will be noted that the terms and wordings used in the specification and the claims should not be construed as general and lexical meanings, but should be construed as the meanings and concepts that agree with the technical spirits of the present disclosure, based on the principle stating that the concepts of the terms may be properly defined by the inventor(s) to describe the present disclosure in the best manner.

First Embodiment

Figure 2:
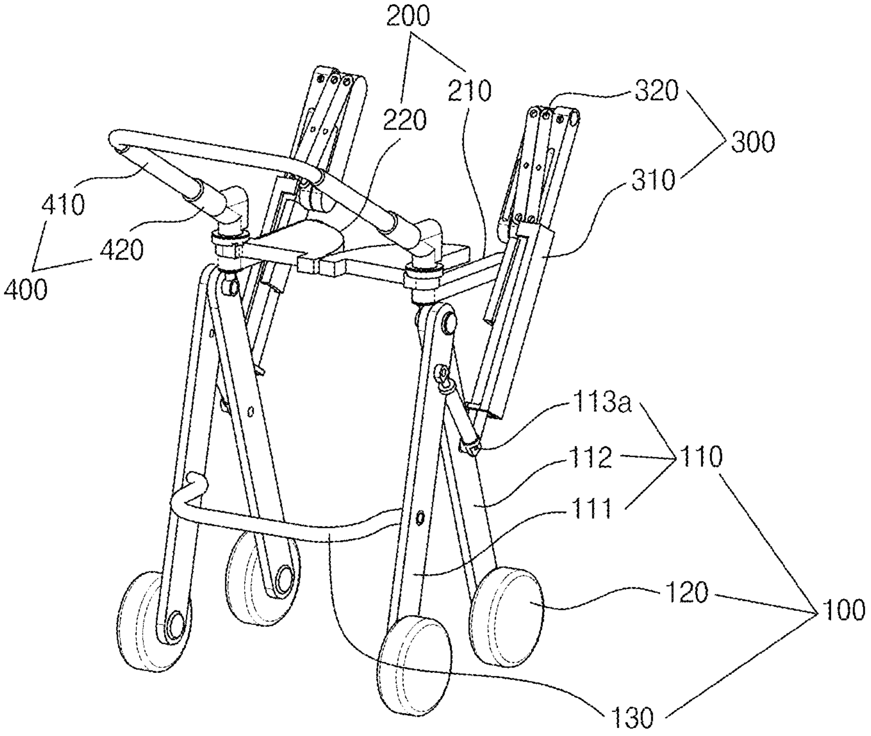
FIG. 2 is a front perspective view illustrating a state in which the back support is opened in the rear side entry type wheelchair according to the first embodiment of the present disclosure.
Figure 3:
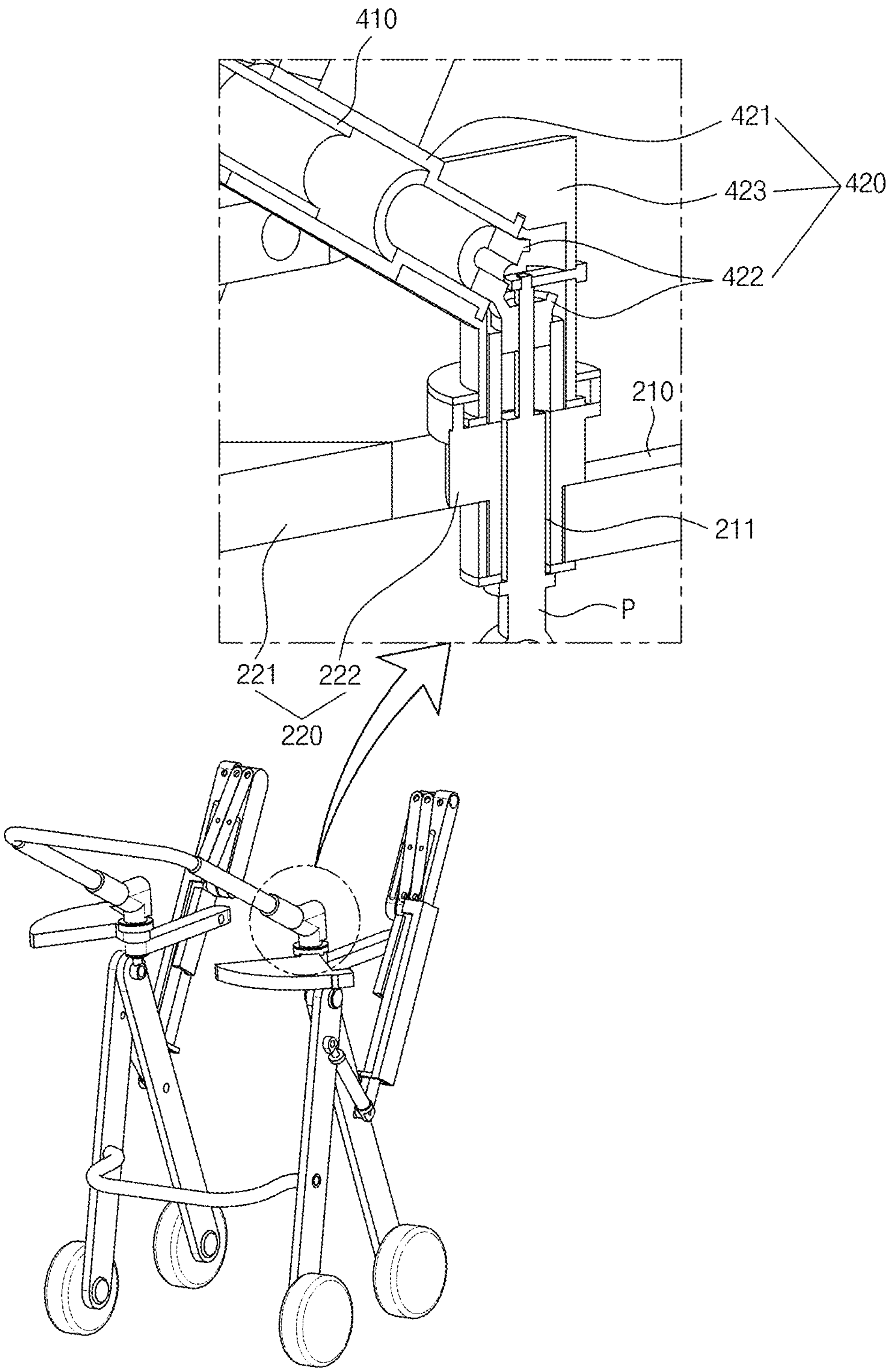
FIG. 3 is an enlarged cross-sectional view illustrating a portion of the rear side entry type wheel chair according to the first embodiment of the present disclosure at which a seat device and a handle device are coupled to each other.
Figure 4:
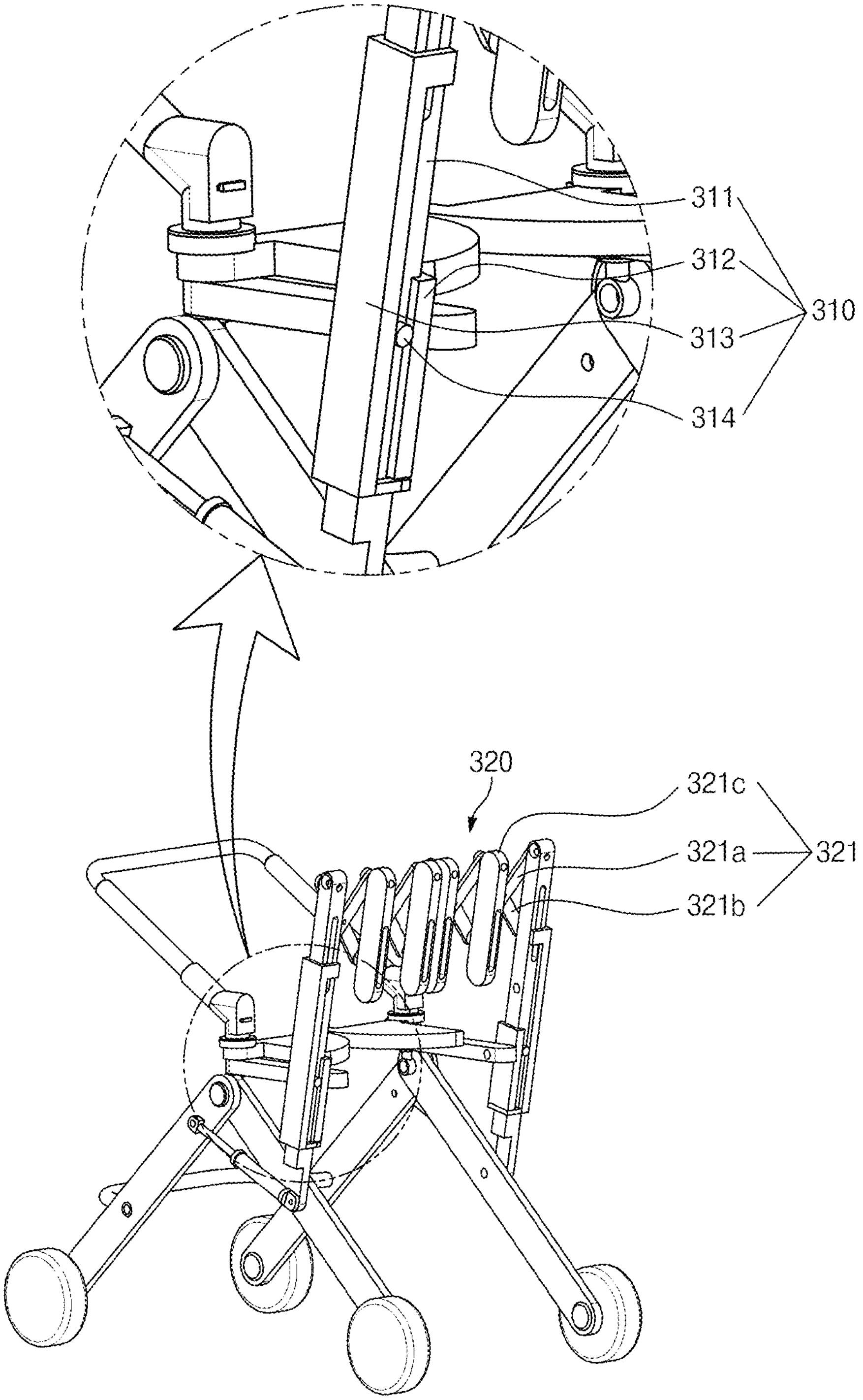
FIG. 4 is an enlarged view illustrating a back support opening/closing interworker of the rear side entry type wheelchair according to the first embodiment of the present disclosure.

FIG. 1 is a front perspective view illustrating a state in which a back support is closed in a rear side entry type wheelchair according to a first embodiment of the present disclosure. FIG. 2 is a front perspective view illustrating a state in which the back support is opened in the rear side entry type wheelchair according to the first embodiment of the present disclosure. FIG. 3 is an enlarged cross-sectional view illustrating a portion of the rear side entry type wheel chair according to the first embodiment of the present disclosure at which a seat device and a handle device are coupled to each other. FIG. 4 is an enlarged view illustrating a back support opening/closing interworker of the rear side entry type wheelchair according to the first embodiment of the present disclosure.

Referring to FIG. 1, a rear side entry type wheel chair according to a first embodiment of the present disclosure includes a driving device 100, a seat device 200, a back support device 300, and a handle device 400.

Referring to FIG. 2, the driving device 100 is a configuration that is in charge of driving of the rear side entry type wheelchair, and includes a pair of driving frames no provided on left and right sides thereof, and driving wheels 120 provided in the driving frames no, respectively. The seat device 200 is a configuration that is located at the center of the rear side entry type wheelchair to support or mutually couple the driving device 100, the handle device 400, and the back support device 300 such that a user may be seated on the wheelchair, and includes a pair of horizontal frames 210 coupled to the driving device 100, and saddles 220 provided to be axis-rotated about a vertical axis on surfaces of the horizontal frames 210, respectively. The back support device 300 is a configuration that is opened when the user enters the wheelchair and is closed when the user is seated to support the back of the user, and includes a back support opening/closing interworker 310 provided on a rear side of the seat device 200, and a back support 320 that is provided in the back support opening/closing interworker 310 to be foldable so as to be opened and closed. The handle device 400 is a configuration that is configured to support a hand of the user, and is provided on a front side of the seat device 200.

According to the rear side entry type wheelchair according to the first embodiment of the present disclosure, because the user may proceed to a rear side of the wheelchair and enter the wheelchair while the back support 320 is opened, convenience of the user is further improved, and the safety of the user and additional damage to the user may be prevented as compared with a conventional wheelchair that employs a scheme in which a user moves rearwards to be seated.

Further, because the saddles 220 that may be axis-rotated are provided such that the wheelchair functions as a walker that helps rehabilitation while the user is standing, the wheelchair may be utilized as a wheelchair that is a movement means when the user is seated, and because the saddles 220 may be rotated such that a seating location of the user may be appropriately adjusted according to the body shape of the user, the user may be seated more stably.

In addition, the back support opening/closing interworker 310 provided on a rear side of the seat device 200, and the back support 320 that is provided in the back support opening/closing interworker 310 to be foldable are provided so that the back support 320 may be adjusted to be opened and closed in conjunction with a change of a height of the seat device 200, and thus convenience of the user may be improved.

Hereinafter, the configurations of the driving device 100, the seat device 200, the back support device 300, and the handle device 400 will be described in more detail with reference to FIGS. 2 to 4.

First, referring to FIG. 2, the driving device 100 includes the pair of driving frames no provided on the left and right sides thereof, and the driving wheels 120 provided in the driving frames no, respectively. Each of the driving frames no may include a front frame 111 provided in a front area of the rear side entry type wheelchair and a rear frame 112 provided in a rear area of the rear side entry type wheelchair, and the front frame iii and the rear frame 112 may be coupled to each other by at least one joint while forming a specific angle at ends thereof. Because the seat device 200, which will be described below, is coupled to an upper portion of the driving frame no, and when the angle between the front frame 111 and the rear frame 112 is adjusted, a height of the seat device 200 may be adjusted. In this way, when the height of the seat device 200 is adjusted, the user may be stably seated.

To achieve this, as illustrated in FIG. 2, the driving frame no of the rear side entry type wheelchair may further include a height adjusting driver 113*a*. As described above, the height adjusting driver 113*a* may function to adjust the height of the seat device 200 by adjusting the angle between the front frame iii and the rear frame 112, and thus, the user may be seated after appropriately adjusting the height of the seat device 200, thereby preventing an additional injury to the body of the user, such as a wrist or a knee joint.

The height adjusting driver 113*a* may be a linear driver, one side and an opposite side of which are connected to the front frame 111 and the rear frame 112, respectively, to adjust the angle between the front frame 111 and the rear frame 112 according to a change in a length thereof. In more detail, when the length of the linear driver connected to the front frame 111 and the rear frame 112 becomes larger, the angle between the front frame 111 and the rear frame 112 increases and the height of the seat device 200 becomes lower, and when the length of the linear driver becomes shorter, the angle between the front frame 111 and the rear frame 112 decreases and the height of the seat device 200 becomes higher. The length of the linear driver may be controlled by an electronic device, and the height of the seat device 200 may be appropriately adjusted with a simple structure.

The driving wheel 120 is provided in the driving frame no and the number of the driving wheels 120 is not limited, but when a pair of front frames in and a pair of rear frames 112 are provided, one driving wheel 120 may be provided at an end of each of the front frames in and the rear frames 112. Further, the driving wheel 120 may be driven by an electric device including a separate power source and an electric motor.

Meanwhile, the driving device 100 of the rear side entry type wheelchair according to an embodiment of the present disclosure, as illustrated in FIG. 2, may further include a bar-shaped foot support 130, and the foot support 130 may be connected to the pair of front frames in such that the feet of the user may be held thereon.

Next, referring to FIGS. 2 and 3, the seat device 200 includes the pair of horizontal frames 210 coupled to the driving device 100, and the saddles 220 configured to be axis-rotated about a vertical axis on surfaces of the horizontal frames 210, respectively. The horizontal frame 210 is a configuration of supporting or mutually coupling the driving device 100, the handle device 400, and the back support device 300, and is configured to face a rear side of the rear side entry type wheelchair according to an embodiment of the present disclosure from a front side thereof, and in particular, as in FIG. 3, has a through-hole 211 that passes upper and lower surfaces thereof on one side thereof such that an insertion/coupling member 222, which will be described below, may be inserted thereinto.

The pair of saddles 220 are provided on left and right sides of the wheelchair, and each of the saddles 220 may include a fan-shaped plate 221, and an insertion/coupling member 222 provided at an edge of the fan-shaped plate 221 and having a hollow portion in an interior thereof. Referring to FIG. 3, the insertion/coupling member 222 is inserted into and coupled to the through-hole 211 formed on one side of the horizontal frame 210, and a cross-section of the insertion/coupling member 222, which is taken horizontally, may correspond to the through-hole 211, and preferably, the insertion/coupling member 222 has a circular cross-section so that the saddle 220 may be axis-rotated on one surface of the horizontal frame 210. In this way, the insertion/coupling member 222 may restrict horizontal linear movement of the saddle 220 and allow only rotation thereof so that the saddle 220 may be rotated according to necessity.

The driving device 100 and the seat device 200 are coupled to each other by a vertical coupling member "P", and in detail, one side of the vertical coupling member "P" is coupled to a joint of the driving frame no and an opposite side of the vertical coupling member "P" is inserted into the hollow portion of the interior of the insertion/coupling member 222 inserted into and coupled to the through-hole 211, and the driving frame no of the driving device 100 and the horizontal frame 210 and the saddle 220 of the seat device 200 may be coupled to each other.

Referring to FIGS. 2 and 4, the back support device 300 includes a pair of back support opening/closing interworkers 310 provided on a rear side of the seat device 200, and a pair of back supports 320 that are provided in the back support opening/closing interworker 310 to be foldable so as to be opened and closed, respectively. Then, the back support opening/closing interworker 310, as described above, may cause the driving frame no and the back support 320 to interwork with each other such that the back support 320 is unfolded when the angle between the front frame 111 and the rear frame 112 is increased by the height adjusting driver 113*a* and the back support 320 is folded when the angle between the front frame 111 and the rear frame 112 decreases.

Referring to FIG. 4, in a detailed description of the back support opening/closing interworker 310, the back support opening/closing interworker 310 may include a link 311, an inner rack 312, an outer rack 313, and a pinion 314.

First, as illustrated in FIGS. 2 and 4, the link 311 may be connected to the rear frame 112, and may be configured to be rotated within a specific range according to the change in the angle between the front frame 111 and the rear frame 112. In particular, because a lower portion of the link 311 is connected to the rear frame 112 of the driving device 100, the link 311 is rotated such that the angle between the front frame 111 and the rear frame 112 increases when the angle between the front frame 111 and the rear frame 112 is increased by the height adjusting driver 113*a*, and the link 311 is rotated such that the angle between the front frame 111 and the rear frame 112 decreases when the angle between the front frame 111 and the rear frame 112 is decreased.

One side of the inner rack 312 may be coupled to the horizontal frame 210, and an opposite side of the inner rack 312 may be coupled to the link 311 to be slid. That is, because the inner rack 312 is coupled to the horizontal frame 210 to be fixed, movement of the link 311 on a front and rear or left and right plane is restricted, and the inner rack 312 may function as a kind of a guide that causes the link 311 to be slid upward and downwards as well.

The outer rack 313 may be located on an opposite side of the inner rack 312 with the link 311 being interposed therebetween, may be coupled to the link 311 to be slid, and may be coupled to be moved in an opposite direction to the inner rack 312. Accordingly, when the inner rack 312 coupled to the horizontal frame 210 is lowered, as described above, the outer rack 313 may be raised such that the back support 320 is unfolded, and when the inner rack 312 is raised, the outer rack 313 is lowered such that the back support 320 is folded.

Then, the back support opening/closing interworker 310 of the rear side entry type wheelchair according to an embodiment of the present disclosure further includes the pinion 314, and the pinion 314 protrudes from the link 311 to be provided between the inner rack 312 and the outer rack 313 so as to function to cause the inner rack 312 and the outer rack 313 to interwork with each other in opposite directions.

In a sequential description of the configuration of the above-described back support opening/closing interworker 310 and the movement according to the configuration, first, when the angle between the front frame iii and the rear frame 112 is increased by the height adjusting driver 113*a*, the horizontal frame 210 and the inner rack 312 are lowered, the link 311 is rotated such that the angle between the front frame iii and the rear frame 112 increases, and the outer rack 313 is raised in conjunction with the lowering of the inner rack 312 by the pinion 314. Then, the back support 320 is closed by the raised outer rack 313.

In contrast, when the angle between the front frame iii and the rear frame 112 is decreased by the height adjusting driver 113*a*, the horizontal frame 210 and the inner rack 312 are raised, the link 311 is rotated such that the angle between the front frame iii and the rear frame 112 decreases, and the outer rack 313 is lowered in conjunction with the raising of the inner rack 312 by the pinion 314. Then, the back support 320 is opened by the lowered outer rack 313.

In this way, by providing the back support opening/closing interworker 310, the back support 320 is opened and closed in conjunction with the movement of the driving device 100 and the seat device 200, and the back support 320 may be opened and closed appropriately according to the walker function or the wheelchair function.

The back support 320, as in FIG. 4, may include at least one folding unit body 321. The folding unit body 321 may include a bar-shaped first folding member 321*a*, a bar-shaped second folding member 321*b* coupled to the first folding member 321*a* to cross the first folding member 321*a* in an X form to be rotatable, and a support member 321*c* coupled to both one end of the first folding member 321*a* and one end of the second folding member 321*b*. That is, the back support 320 may be folded and unfolded through rotation of the first folding member 321*a* and the second folding member 321*b* coupled to cross each other in the X form, and the structurally stable foldable back support 320 may be implemented.

As described above, the folding unit body 321 may include at least one folding unit body 321, and in particular, according to the folding unit body 321 directly coupled to the back support opening/closing interworker 310, an opposite end of the first folding member 321*a* is coupled to the link 311 and an opposite end of the second folding member 321*b* is coupled to the outer rack 313 so that the back support 320 may be unfolded when the link 311 is lowered and the outer rack 313 is raised and the back support 320 may be folded when the link 311 is raised and the outer rack 313 is lowered.

Referring to FIG. 2, the handle device 400 may be provided on a front side of the seat device 200, and may include a handle 410 and a saddle adjusting device 420 formed at an end of the handle 410. The saddle adjusting device 420 connects the handle 410 and the saddles 220, and may adjust a location of the saddles 220 by rotating the saddles 220. In this way, by providing the saddle adjusting device 420 to the handle device 400, the saddles 220 may be naturally rotated by both hands of the user while the user is standing so that the location of the saddles 220 may be adjusted, and thus convenience of the user may be improved. However, the saddles 220 are not necessarily rotated only through rotation of the saddle adjusting device 420, and may be naturally rotated when the user proceeds and applies a force to the saddles 220 with his or her lower body or the like.

Hereinafter, the saddle adjusting device 420 will be described in detail with reference to FIGS. 2 and 3. The saddle adjusting device 420 may include a saddle adjusting member 421, a miter gear 422, and a gear frame 423. The saddle adjusting member 421 may be coupled to be rotatable on an outer peripheral surface of the handle 410, and the miter gear 422 may transmit rotational power applied to the saddle adjusting member 421 to the saddles 220. That is, when the user rotates the saddle adjusting member 421 coupled to the outer peripheral surface of the handle 410, the rotational power may be transmitted to the saddles 220 by the miter gear 422 engaged with the saddle adjusting member 421.

An upper portion of the gear frame 423 is provided to protect the saddle adjusting member 421 and the miter gear 422 to protect the miter gear 422 from an external impact, and a lower portion of the gear frame 423 is coupled to the insertion/coupling member 222 of the saddles 220 to connect the handle device 400 and the seat device 200.

Second Embodiment

The second embodiment of the present disclosure is different from the first embodiment in that the height adjusting driver 113*b* of the first embodiment is a rotary driver. The common contents of the first embodiment will be omitted if possible, and a difference of the second embodiment will be mainly described. That is, it is apparent that the contents that have not been described in the second embodiment may be regarded as the contents of the first embodiment.

Figure 5:
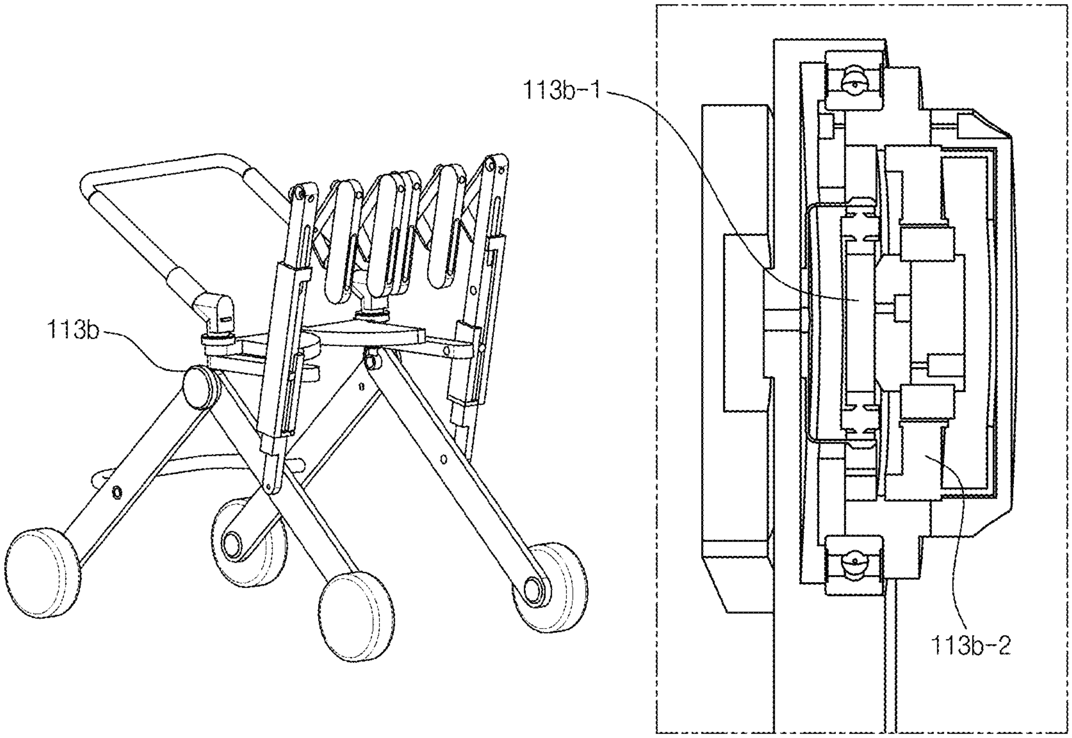
FIG. 5 is an enlarged view illustrating a rear side entry type wheelchair according to a second embodiment of the present disclosure, and a cross-section of a height adjusting driver.

FIG. 5 illustrates an enlarged view illustrating a rear side entry type wheelchair according to the second embodiment of the present disclosure, and a cross-section of a height adjusting driver.

Referring to FIG. 5, the height adjusting driver 113*b* according to the second embodiment of the present disclosure may be a rotary driver. The rotary driver may be provided in the joint and may adjust the angle between the front frame 111 and the rear frame 112 through driving of a harmonic reducer 113*b*-1 and rotation of a motor 113*b*-2 included in an interior thereof. In regard to the other detailed configurations of the rotary driver, those generally known to an ordinary person in the art may be employed.

Next, a modification process and a use method of the rear side entry type wheelchair according to an embodiment of the present disclosure will be discussed with reference to FIGS. 6 and 7.

Figure 6A:
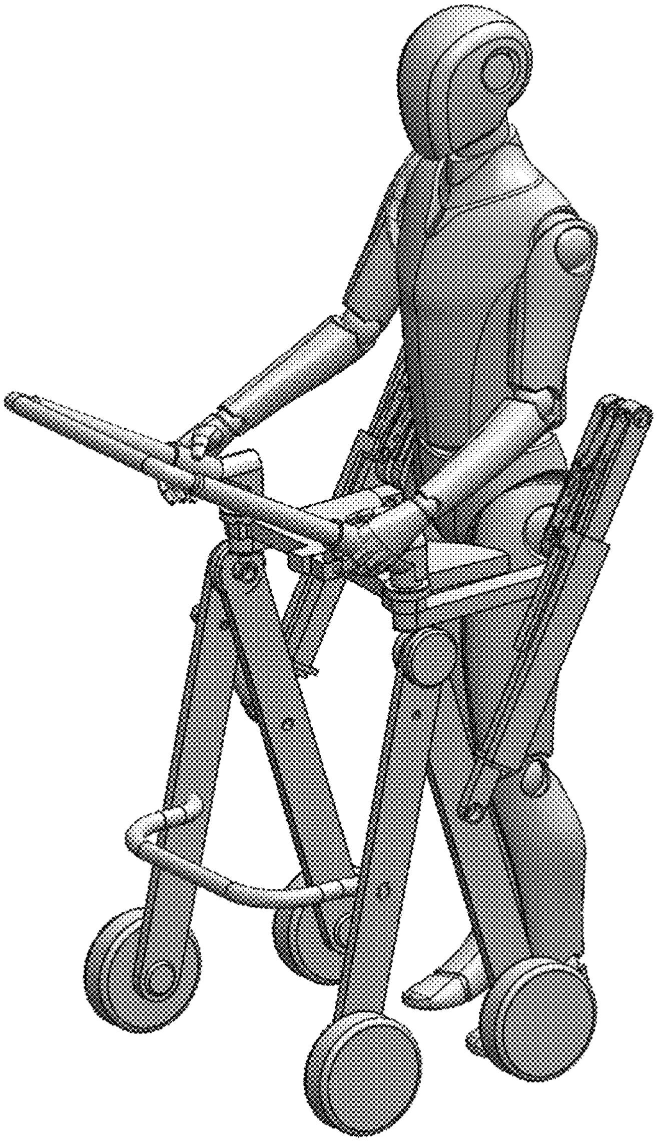
FIGS. 6A and 6B are views exemplarily illustrating a state in which the rear side entry type wheelchair according to the second embodiment of the present disclosure is used for the purpose of a walker.
Figure 6B:
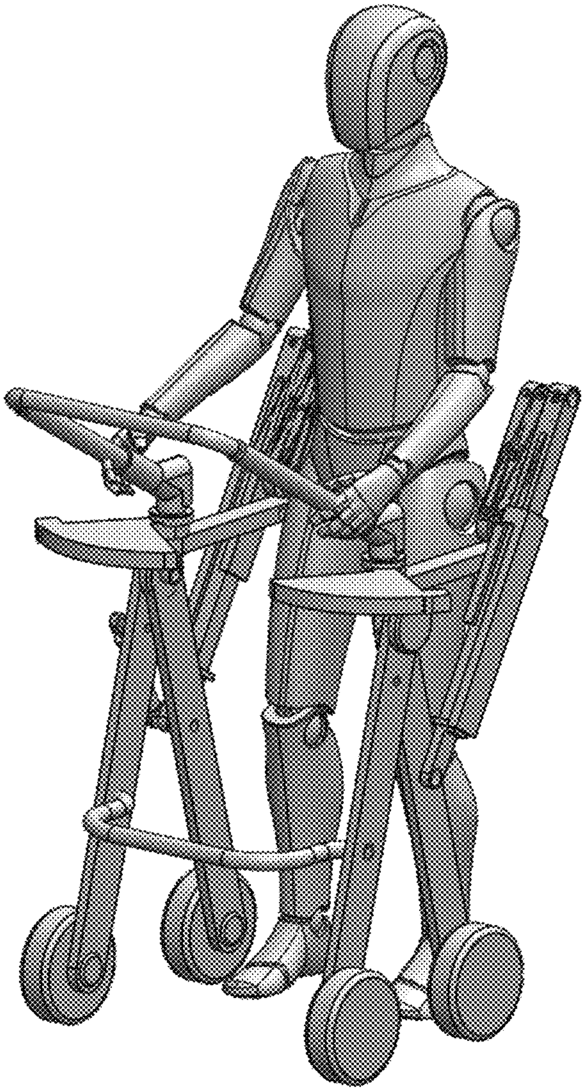

First, FIGS. 6A and 6B are views exemplarily illustrating a state in which the rear side entry type wheelchair according to the second embodiment of the present disclosure is used for the purpose of a walker. Referring to FIG. 6A, the user may proceed to the rear surface of the wheelchair and enter the wheelchair. Then, the angle between the front frame 111 (see FIG. 2) and the rear frame 112 (see FIG. 2) is decreased by the height adjusting driver 113*b* (see FIG. 5), and the back support 320 (see FIG. 2) is opened as the horizontal frame 210 (see FIG. 2) and the inner rack 312 (see FIG. 4) are raised and the outer rack 313 (see FIG. 4) is lowered. Referring to FIG. 6B, the user may rotate the saddles 220 (see FIG. 2) by applying a force to the lower body while entering the rear side of the wheelchair, or may rotate the saddles 220 (see FIG. 2) by rotating the saddle adjusting member 421 (see FIG. 3). The user who appropriately rotated the saddles 220 (see FIG. 2) may directly move for a rehabilitation treatment while gripping the handles 410 (see FIG. 2).

Figure 7A:
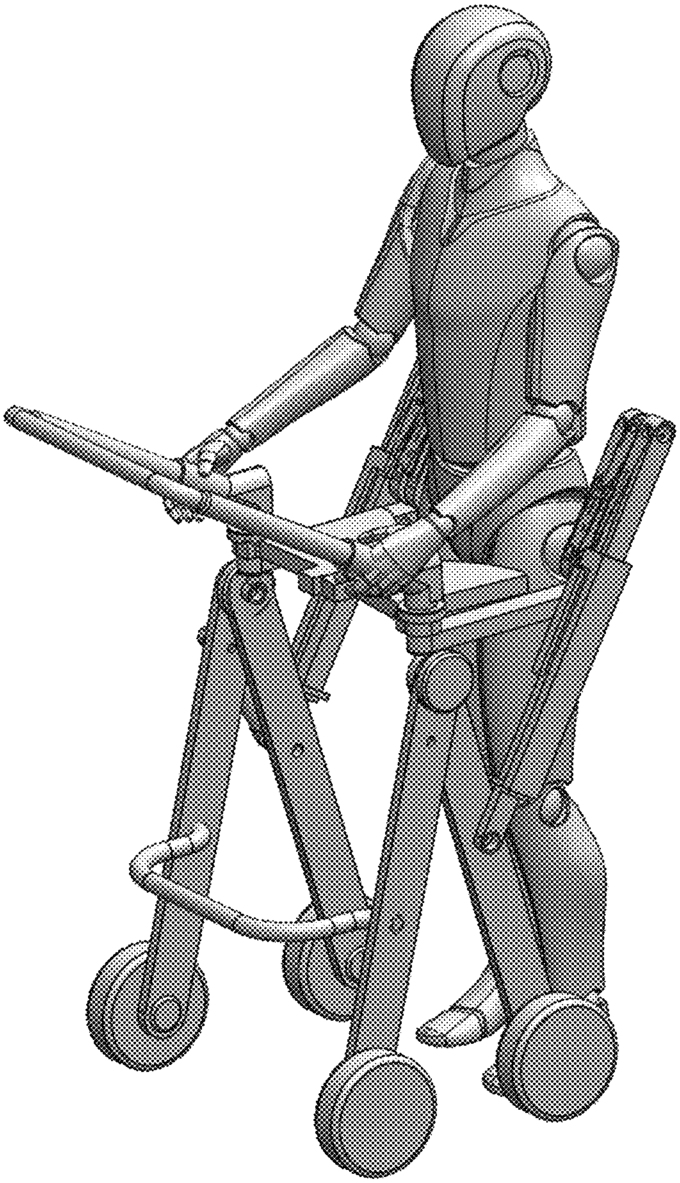
FIGS. 7A to 7E are views exemplarily illustrating a process of using the rear side entry type wheelchair according to the second embodiment of the present disclosure.
Figure 7B:
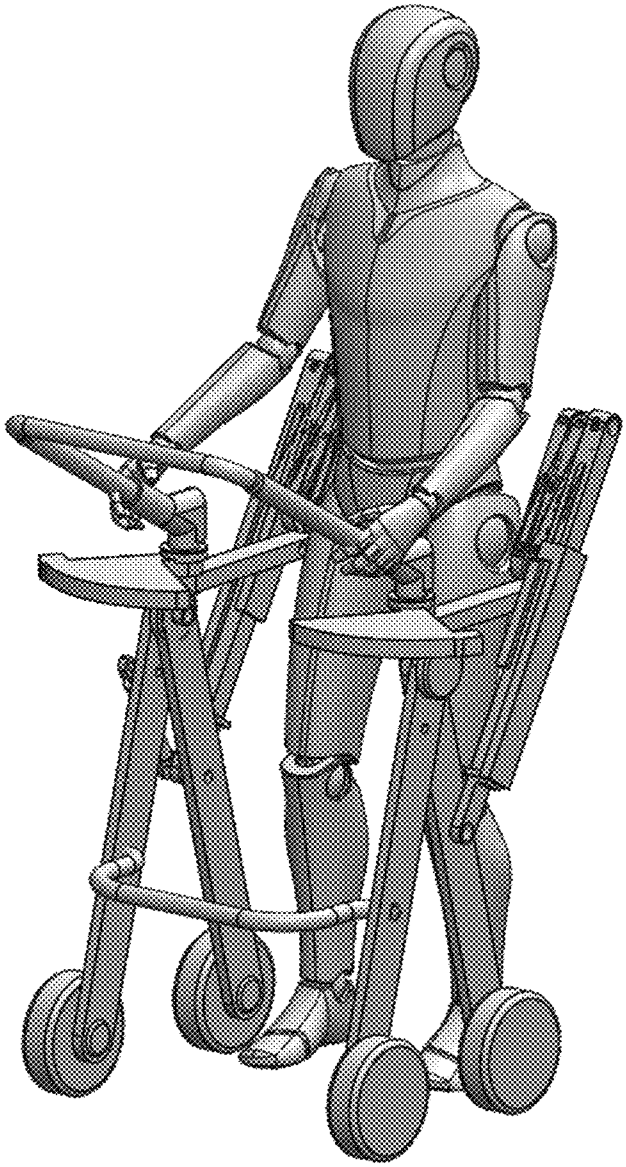
Figure 7C:
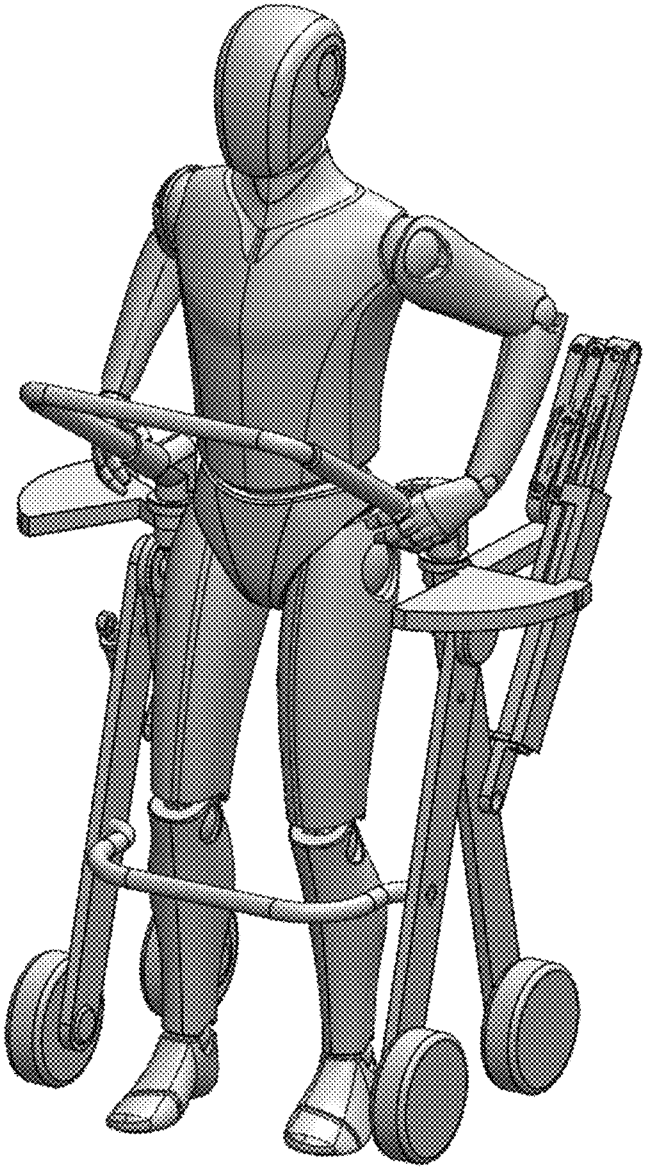
Figure 7D:
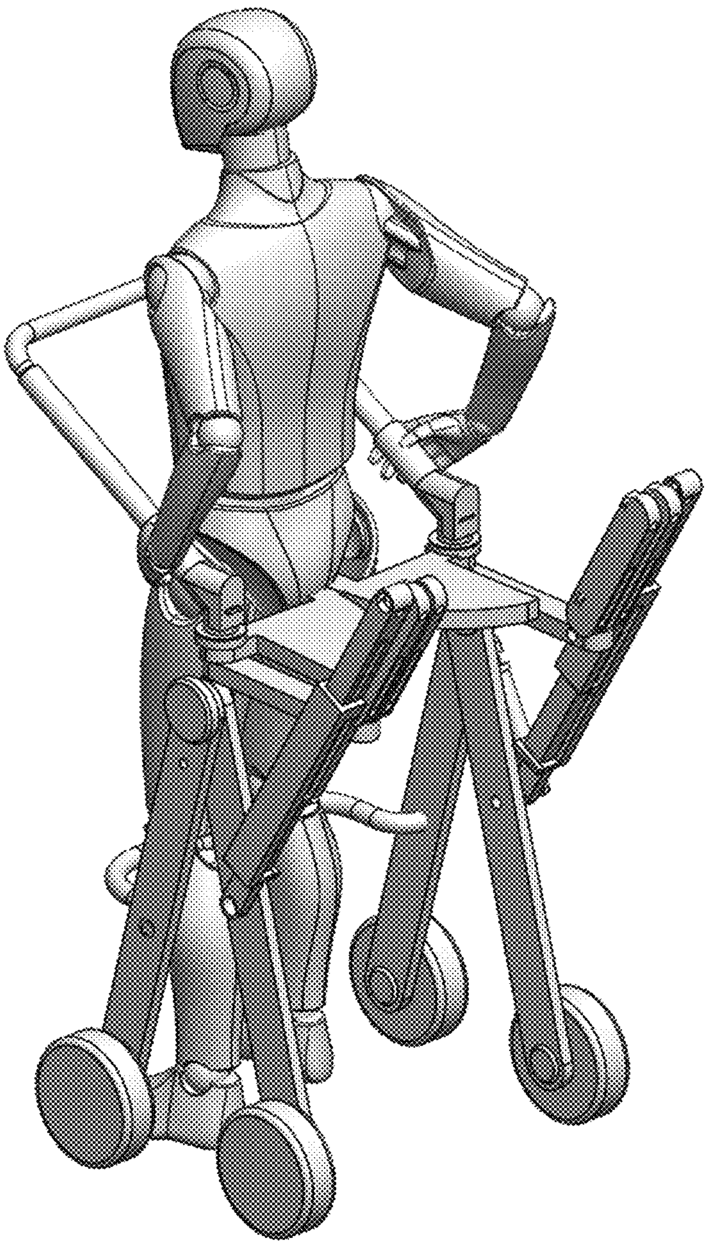
Figure 7E:
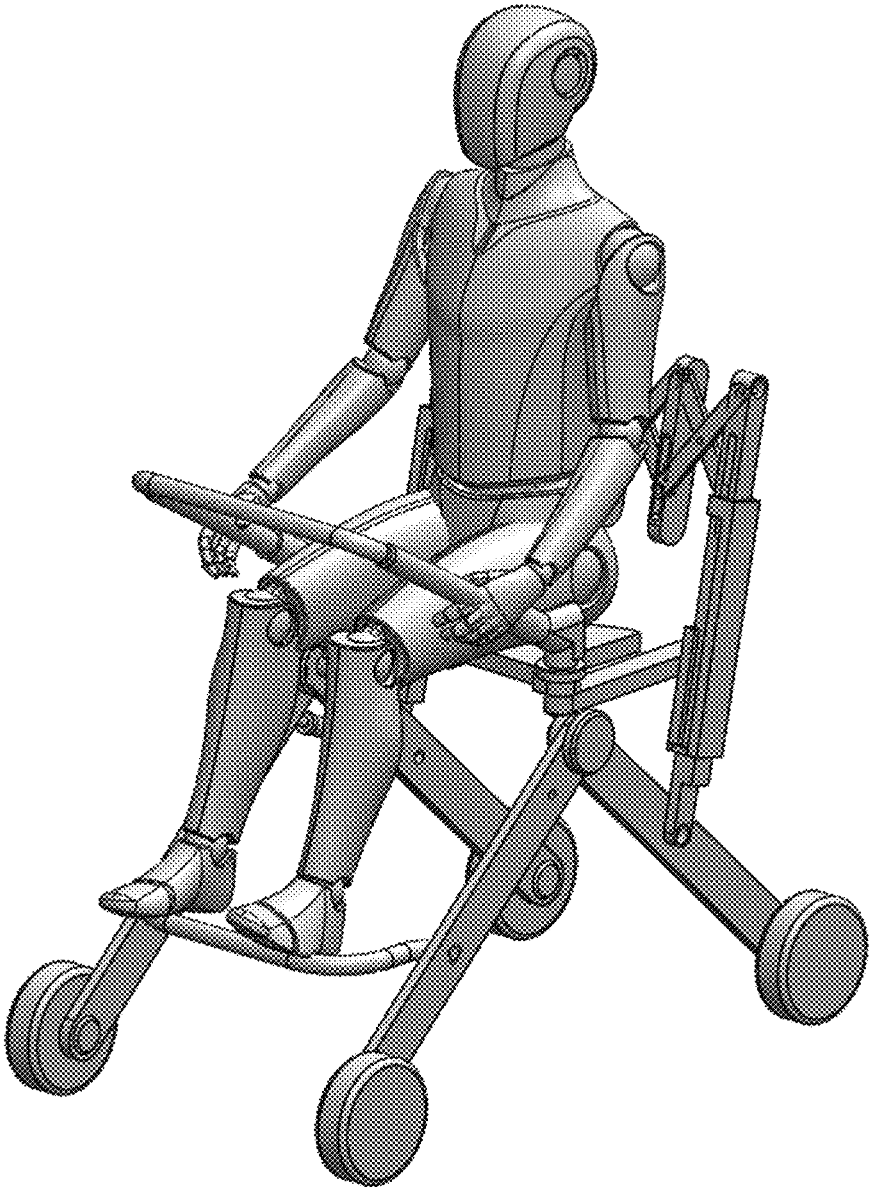

Next, FIGS. 7A to 7E are views exemplarily illustrating a process of using the rear side entry type wheelchair according to the second embodiment of the present disclosure. Referring to FIG. 7A, after proceeding to the rear side of the wheelchair and entering the rear side of the wheel chair, the user may rotate the saddles 220 (see FIG. 2) as illustrated in FIGS. 7B and 7C, may appropriately adjust the locations of the saddles 220 (see FIG. 2) as illustrated in FIG. 7D, and may be seated to use the wheel chair as illustrated in FIG. 7E.

In particular, in a description of a change from FIG. 7D to FIG. 7E, when the user operates the height adjusting driver 113*b* (see FIG. 5), the angle between the front frame 111 (see FIG. 2) and the rear frame 112 (see FIG. 2) may increase, and accordingly, the horizontal frame 210 (see FIG. 2) and the inner rack 312 (see FIG. 4) may be lowered. At the same time, the link 311 (see FIG. 4) may be rotated such that the angle between the front frame 111 (see FIG. 2) and the rear frame 112 (see FIG. 2) increases, the outer rack 313 (see FIG. 4) may be raised in conjunction with the inner rack 312 (see FIG. 4) by the pinion 314 (see FIG. 4), and the back support 320 (see FIG. 2) may be closed by the raised outer rack 313 (see FIG. 4).

According to embodiments of the present disclosure, the rear side entry type wheelchair functions as a walker that helps rehabilitation while a user is standing and functions as a movement means while the user is seated, and, in particular, allows the user to be seated after adjusting a location and a height of saddles after entering a rear side of the wheelchair to improve convenience and secure safety.

Although the present disclosure has been described with reference to the exemplary embodiments and the drawings, the present disclosure is not limited thereto, and it is apparent that the present disclosure may be variously carried out by an ordinary person in the art within the technical spirit of the present disclosure and the equivalent ranges of the claims.

What is claimed is:

1. A wheelchair comprising:

a driving device, comprising:
- a pair of driving frames provided on left and right sides thereof; and
- driving wheels provided in the driving frames, respectively;

a seat device, comprising:
- a pair of horizontal frames coupled to the driving device; and
- saddles configured to be rotated about a vertical shaft on surfaces of the horizontal frames;

a back support device, comprising:
- a back support opening/closing interworker provided on a rear side of the seat device;
- a back support provided in the back support opening/closing interworker and configured to be foldable so as to be opened and closed; and a handle device provided on a front side of the seat device, wherein:
- each of the driving frames comprises:
  - a front frame; and
  - a rear frame coupled to the front frame with a joint while forming a specific angle with the front frame, and
  - a height adjusting driver configured to adjust a height of the seat device by adjusting the angle between the front frame and the rear frame, and
- the height adjusting driver is a rotary driver provided in the joint, and is configured to adjust the angle between the front frame and the rear frame through rotation of a motor included in an interior thereof.

2. The wheelchair of claim 1, wherein the height adjusting driver is:

a linear driver connected to the front frame and the rear frame, and configured to adjust the angle between the front frame and the rear frame according to a change in a length thereof.

3. The wheelchair of claim 1, wherein the back support opening/closing interworker is configured to:

unfold the back support based on the angle between the front frame and the rear frame being increased by the height adjusting driver; and cause the driving frames and the back support to interwork with each other such that the back support is configured to be folded based on the angle between the front frame and the rear frame being decreased.

4. The wheelchair of claim 3, wherein the back support opening/closing interworker comprises:

a link connected to the rear frame, the link being configured to be rotated within a specific range according to a change in the angle between the front frame and the rear frame;

an inner rack having a first side coupled to the horizontal frame and a second opposite side coupled to the link to be slid;

an outer rack located on an opposite side of the inner rack with the link being interposed therebetween, coupled to the link to be slid, and coupled to be moved in an opposite direction to the inner rack; and a pinion protruding from the link provided between the inner rack and the outer rack, the pinion being configured to cause movements of the inner rack and the outer rack to interwork with each other in opposite directions.

5. The wheelchair of claim 4, wherein:

the back support comprises a folding unit body, and wherein the folding unit body comprises:

a bar-shaped first folding member;

a bar-shaped second folding member coupled to the first folding member to cross the first folding member in an X form so as to be rotatable; and a support member coupled to a first end of the first folding member and a first end of the second folding member.

6. The wheelchair of claim 5, wherein:

the folding unit body is directly coupled to the back support opening/closing interworker such that a second opposite end of the first folding member is coupled to the link, a second opposite end of the second folding member is coupled to the outer rack so that the back support is configured to be unfolded in response to the link being lowered and the outer rack being raised, and the back support is configured to be folded in response to the link being raised and the outer rack being lowered.

7. The wheelchair of claim 1, wherein the driving device further comprises a foot support provided in the front frame.

8. A wheelchair comprising:

a driving device comprising:

a pair of driving frames provided on left and right sides thereof; and driving wheels provided in the driving frames, respectively;

a seat device comprising:

a pair of horizontal frames coupled to the driving device; and saddles configured to be rotated about a vertical shaft on surfaces of the horizontal frames, wherein each of the horizontal frames has a through-hole on one side thereof;

a back support device comprising:

a back support opening/closing interworker provided on a rear side of the seat device;

a back support provided in the back support opening/closing interworker and configured to be foldable so as to be opened and closed; and a handle device provided on a front side of the seat device, wherein:

each of the saddles comprises:

a plate; and an insertion/coupling member provided at an edge of the plate and having a hollow portion in an interior thereof, and the insertion/coupling member is inserted into and coupled to the through-hole such that the saddle is configured to be axis-rotated on one surface of the horizontal frame.

9. The wheelchair of claim 8, wherein the driving device and the seat device are coupled to each other by a vertical coupling member.

10. The wheelchair of claim 9, wherein:

a first side of the vertical coupling member is coupled to the driving frame, and a second opposite side of the vertical coupling member is inserted into the hollow portion of the interior of the insertion/coupling member inserted into and coupled to the through-hole.

11. The wheelchair of claim 8, wherein each of the driving frames comprises:

a front frame; and a rear frame coupled to the front frame with a joint while forming a specific angle with the front frame.

12. The wheelchair of claim 11, wherein the driving device further comprises a foot support provided in the front frame.

13. A wheelchair comprising:

a driving device comprising:

a pair of driving frames provided on left and right sides thereof; and driving wheels provided in the driving frames, respectively;

a seat device comprising:

a pair of horizontal frames coupled to the driving device; and saddles configured to be rotated about a vertical shaft on surfaces of the horizontal frames;

a back support device comprising:

a back support opening/closing interworker provided on a rear side of the seat device;

a back support provided in the back support opening/closing interworker and configured to be foldable so as to be opened and closed; and a handle device provided on a front side of the seat device, wherein:

the handle device comprises:

a handle; and a saddle adjusting device connecting the handle and the saddles, the saddle adjusting device being configured to adjust a location of the saddles by rotating the saddles, and the saddle adjusting device comprises:

a saddle adjusting member coupled to an outer peripheral surface of the handle and configured to be rotatable;

a miter gear configured to transmit rotational power applied to the saddle adjusting member to the saddles; and a gear frame surrounding the saddle adjusting member and the miter gear.

14. The wheelchair of claim 13, wherein each of the saddles comprises:

a plate; and an insertion/coupling member provided at an edge of the plate and having a hollow portion in an interior thereof.

* * * * *